US012604382B2

(12) United States Patent
Lu et al.

(10) Patent No.: US 12,604,382 B2
(45) Date of Patent: Apr. 14, 2026

(54) LIGHTING DEVICE HAVING MULTI-STAGE CHIP POWER SUPPLYING MECHANISM CAPABLE OF IMPROVING DRIVING EFFICIENCY

(71) Applicant: Xiamen PVTECH Co., Ltd., Xiamen (CN)

(72) Inventors: Fuxing Lu, Xiamen (CN); Zhirong Lin, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 0 days.

(21) Appl. No.: 18/443,328

(22) Filed: Feb. 16, 2024

(65) Prior Publication Data

US 2025/0185134 A1 Jun. 5, 2025

(30) Foreign Application Priority Data

Dec. 1, 2023 (CN) ......................... 202311649081.3

(51) Int. Cl.
*H05B 45/37* (2020.01)
*H05B 45/355* (2020.01)
*H05B 45/3725* (2020.01)

(52) U.S. Cl.
CPC ........ *H05B 45/355* (2020.01); *H05B 45/3725* (2020.01)

(58) Field of Classification Search
CPC ...... H05B 45/37; H05B 45/38; H05B 45/355; H05B 45/375; H05B 45/385; H05B 45/395; H05B 45/3725
See application file for complete search history.

(56) References Cited

U.S. PATENT DOCUMENTS 9,520,794 B2 * 12/2016 Maru ................ H02M 3/33523
10,616,968 B2 * 4/2020 Wang ..................... H05B 45/31
(Continued)

FOREIGN PATENT DOCUMENTS

JP 2010287499 A 12/2010
JP 2014013698 A 1/2014
(Continued)

*Primary Examiner* — Tung X Le
(74) *Attorney, Agent, or Firm* — Bruce Stone LLP; Joseph A. Bruce

(57) ABSTRACT

A lighting device having multi-stage chip power supplying mechanism capable of improving driving efficiency includes a light-emitting module, a rectifying module, a pre-startup module, a power factor correction module, a voltage converting module and an auxiliary power source module. The rectifying module generates a rectified voltage. The pre-startup module receives the rectified voltage to enter on state and converts he rectified voltage into a pre-startup voltage. The power factor correction module receives the pre-startup voltage to enter on state and converts the rectified voltage into a corrected voltage. The voltage converting module converts the corrected voltage into a driving voltage to drive the light-emitting module. The voltage converting module includes a voltage extracting unit for converting the driving voltage into an output voltage according to a default converting ratio. The auxiliary power source module converts the output voltage into an operating voltage to drive the power factor correction module.

10 Claims, 3 Drawing Sheets

(56) References Cited

U.S. PATENT DOCUMENTS

| | | | | |
|---|---|---|---|---|
| 2010/0026208 | A1* | 2/2010 | Shteynberg ........ | H05B 45/3725 315/297 |
| 2011/0043134 | A1* | 2/2011 | Lee .................... | H05B 45/3725 315/294 |
| 2011/0309759 | A1* | 12/2011 | Shteynberg ........ | H05B 45/3575 315/201 |
| 2014/0218978 | A1* | 8/2014 | Heuken ................ | H05B 45/385 363/21.16 |
| 2016/0057824 | A1* | 2/2016 | Hu ......................... | H05B 45/38 315/210 |

FOREIGN PATENT DOCUMENTS

| | | | |
|---|---|---|---|
| JP | 2014143209 | A | 8/2014 |
| JP | 2017142924 | A | 8/2017 |

* cited by examiner

LIGHTING DEVICE HAVING MULTI-STAGE CHIP POWER SUPPLYING MECHANISM CAPABLE OF IMPROVING DRIVING EFFICIENCY

BACKGROUND OF THE INVENTION

1. Field of the Invention

The present invention relates to a lighting device, in particular to a lighting device having multi-stage chip power supplying mechanism capable of improving driving efficiency.

2. Description of the Prior Art

With the continuous improvement of light-emitting diode (LED) lighting technology, there is a growing demand for high-quality LED driver power supplies. The combination of an active power factor correction (APFC) circuit and a buck converter can prevent changes in input voltage from affecting the light produced by lighting devices and effectively eliminate flicker. Therefore, the application of the combination of APFC circuit and buck converter is becoming more comprehensively in use. However, as the luminous efficiency of LEDs increases, the power of driver power supplies needs to be gradually reduced to ensure stable luminous flux. Nevertheless, as the power of driver power supplies decreases, the issue of power supply losses in driving chips has also attracted attention.

Currently available driver power supplies, when applied to products with a wide input voltage range, experience increased losses due to significant voltage differences for powering driving chips. Additionally, during frequency variations, there is considerable voltage fluctuation in supplying power to driving chips, further exacerbating losses. These factors not only directly lead to overheating of driving chips but also affect the reliability of these chips.

China Patent Publication No.: CN116685022A and Taiwan Patent Publication No.: TW201328152A have also disclosed improved circuit structures, but these circuits still fail to effectively solve the above problems.

SUMMARY OF THE INVENTION

One embodiment of the present invention provides a lighting device having multi-stage chip power supplying mechanism capable of improving driving efficiency, which includes a light-emitting module, a rectifying module, a pre-startup module, a power factor correction module, a voltage converting module and an auxiliary power source module. The rectifying module generates a rectified voltage. The pre-startup module receives the rectified voltage to enter on state and converts the rectified voltage into a pre-startup voltage. The power factor correction module receives the pre-startup voltage to enter on state and converts the rectified voltage into a corrected voltage. The voltage converting module converts the corrected voltage into a driving voltage in order to drive the light-emitting module. The voltage converting module includes a voltage extracting unit for converting the driving voltage into an output voltage according to a default converting ratio. The auxiliary power source module converts the output voltage into an operating voltage so as to drive the power factor correction module.

In one embodiment, the voltage extracting unit is a transformer.

In one embodiment, the pre-startup module comprises a first resistor, a second resistor, a third resistor, a first switch and a first diode. One end of the first resistor is connected to a first node and the other end of the first resistor is connected one end of the second resistor. The other end of the second resistor is connected to the first end of the first switch and the negative electrode of the first diode, and the positive electrode of the first diode is connected to a second node. One end of the third resistor is connected to the first node and the other end of the third resistor is connected to one end of the fourth resistor. The other end of the fourth resistor is connected to the second end of the first switch and the third end of the first switch is connected to a third node. The first node and the second node are connected to the two output ends of the rectifying module respectively, and the third node is connected to the power supplying pin of the power factor correction module.

In one embodiment, the second node is further connected to a grounding point.

In one embodiment, the auxiliary power source module includes a second diode, a fifth resistor ad an operating voltage outputting end. The positive electrode of the second diode is connected to the voltage extracting unit and the negative electrode of the second diode is connected to one end of the fifth resistor. The other end of the fifth resistor is connected to the operating voltage outputting end and the operating voltage outputting end is connected to the third node.

In one embodiment, the lighting device further includes a filtering module connected to an external power source and the rectifying module.

In one embodiment, the lighting device further includes an input module. The filtering module is connected to the external power source via the input module.

In one embodiment, the lighting device further includes a protection module disposed between the filtering module and the input module.

In one embodiment, the power factor correction module is an active power factor correction circuit.

In one embodiment, the voltage converting module is a buck converter, a boost converter, a buck-boost converter or a flyback converter.

The lighting device having multi-stage chip power supplying mechanism capable of improving driving efficiency in accordance with the embodiments of the present invention may have the following advantages:

(1) In one embodiment of the present invention, the lighting device comprises a light-emitting module, a rectifying module, a pre-startup module, a power factor correction module, a voltage converting module, and an auxiliary power source module. The rectifying module generates a rectified voltage. The pre-startup module receives the rectified voltage to enter the on state and then converts the rectified voltage into pre-startup voltage. The power factor correction module receives the pre-startup voltage to enter the on state and further converts the rectified voltage into a corrected voltage. The voltage converting module includes a voltage extracting unit. The voltage converting module converts the corrected voltage into driving voltage to drive the light-emitting module, and the voltage extracting unit converts the driving voltage into an output voltage according to a default converting ratio. The auxiliary power source module converts the output voltage into operating voltage to drive the power factor correction module. After the power factor correction module is driven by the operating voltage, the pre-startup module enters the off state. The multi-stage chip power supplying mechanism described above includes a pre-startup mode and a normal power supplying mode, where the pre-startup mode can start the power factor correction module when the lighting device is connected to an external power source, which can meet the requirements of a wide input voltage. Therefore, the lighting device can conform to actual requirements.

(2) In one embodiment of the present invention, the lighting device has a special multi-stage chip power supplying mechanism including the pre-startup mode and normal power supplying mode. The pre-startup mode can start the power factor correction module when the lighting device is connected to the external power source, and the operation mechanism of the normal power supplying mode is independent of the input voltage, so the control chip of the power factor correction module can have a constant operating voltage under variable input voltage conditions, which can achieve low losses. Consequently, the losses of the lighting device do not increase with changes in input voltage, which can significantly improve the driving efficiency of the lighting device and effectively enhancing the performance and reliability of the lighting device.

(3) In one embodiment of the present invention, the lighting device has the special multi-stage chip power supplying mechanism including the pre-startup mode and normal power supplying mode. The pre-startup mode can start the power factor correction module when the lighting device is connected to the external power source, and the operation mechanism of the normal power supplying mode is independent of changes in operating frequency. Accordingly, the control chip of the power factor correction module can have a constant operating voltage under variable operating frequency conditions, which can achieve low losses and further enhancing the driving efficiency. Therefore, the performance and reliability of the lighting device can be further enhanced.

(4) In one embodiment of the present invention, the normal power supplying mode of the multi-stage chip power supplying mechanism of the lighting device can stably drive the control chip of the power factor correction module. Thus, the control chip can stably operate for a long time. As a result, the operating temperature of the control chip can be significantly reduced, which can decrease the energy consumption of the lighting device in order to satisfy the requirements of energy conservation. Therefore, the lighting device can meet future development trends.

(5) In one embodiment of the present invention, the multi-stage chip power supplying mechanism of the lighting device can be implemented with a simple circuit, so the lighting device can achieve the desired technical effects without significantly increasing the cost thereof. As a result, the practicality of the lighting device can be further enhanced. Consequently, the application of the lighting device can be more comprehensive so as to conform to the requirements of different applications.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
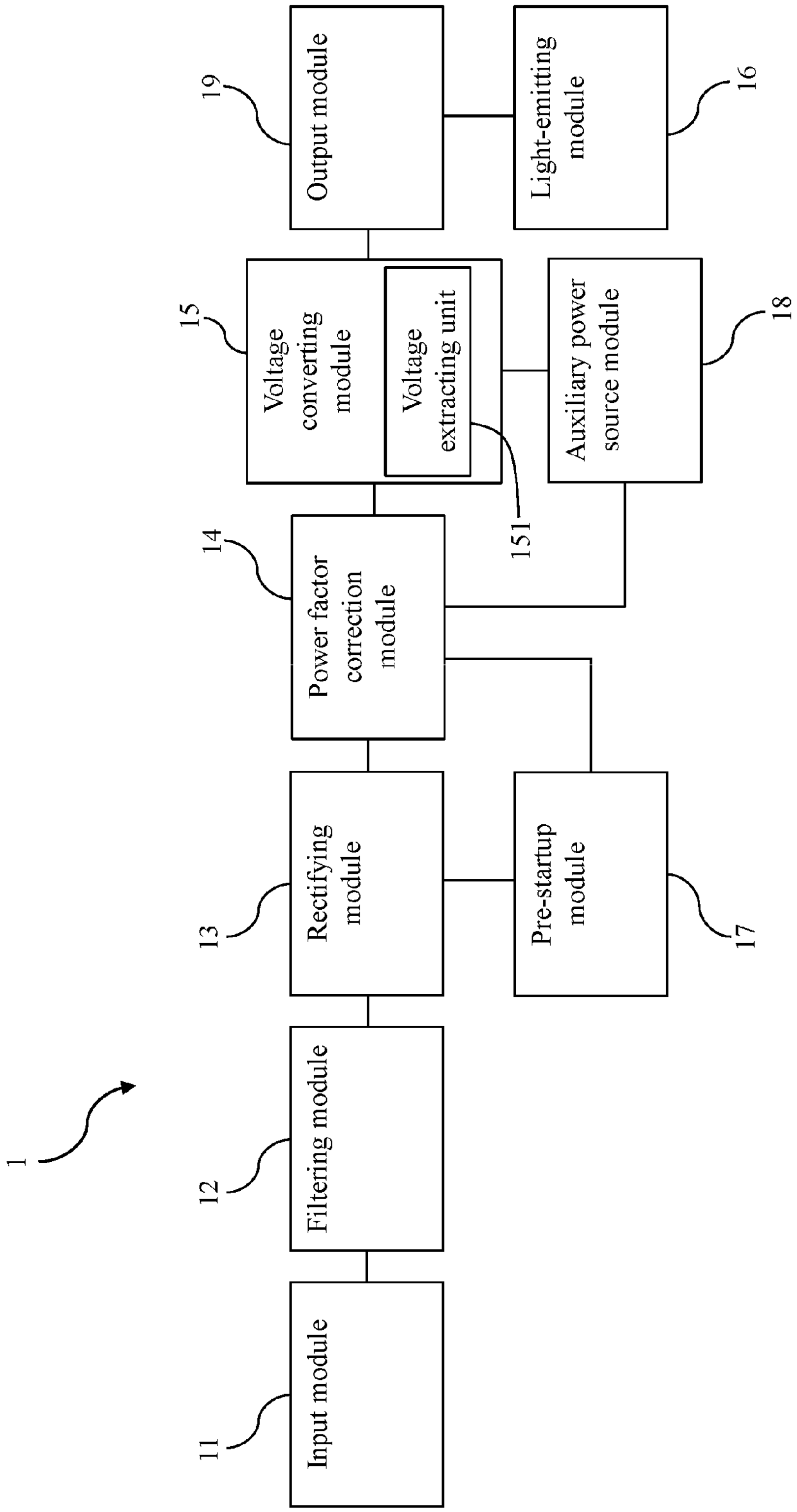
FIG. 1 is the block diagram of the circuit structure of the lighting device with multi-stage chip power supplying mechanism capable of improving driving efficiency in accordance with the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which the block diagram of the circuit structure of the lighting device with multi-stage chip power supplying mechanism capable of improving driving efficiency in accordance with the first embodiment of the present invention. As shown in FIG. 1, the lighting device 1 includes an input module 11, a filtering module 12, a rectifying module 13, a power factor correction module 14, a voltage converting module 15, a light-emitting module 16, a pre-startup module 17, an auxiliary power source module 18, and an output module 19.

The input module 11 is connected to an external power source (not shown in the drawings). In one embodiment, the external power source can be a utility power. In another embodiment, the external power source can be a generator or other power grids capable of supplying AC input voltage.

The filtering module 12 is connected to the input module 11. In one embodiment, the filtering module 12 can be an electromagnetic interference filtering circuit. The circuit structure of the filtering module 12 is known to those skilled in the art and can be modified according to actual requirements, so will not be not further elaborated herein.

The rectifying module 13 is connected to the filtering module 12. In one embodiment, the rectifying module 13 may include a full-wave rectifier. In another embodiment, the rectifying module 13 may also include a half-wave rectifier.

The power factor correction module 14 is connected to the rectifying module 13. In one embodiment, the power factor correction module 14 may be an active power factor correction (APFC) circuit (which is a boost circuit). In another embodiment, the power factor correction module 14 may be a passive power factor correction (Passive PFC) circuit, dynamic power factor correction (Dynamic PFC) circuit, or other similar components. The circuit structure of the power factor correction module 14 is known to those skilled in the art, so will not be further elaborated herein.

The voltage converting module 15 is connected to the power factor correction module 14, and includes a voltage extracting unit 151. In one embodiment, the voltage converting module 15 can be a buck converter. In another embodiment, the voltage converting module 15 can be a boost converter, a buck-boost converter, a flyback converter, or other similar components. In one embodiment, the voltage extracting unit 151 is a transformer. In another embodiment, the voltage extracting unit 151 can also be another component with similar function.

The output module 19 is connected to the voltage converting module 15, and the light-emitting module 16 is connected to the output module 19. In one embodiment, the light-emitting module 16 may include one or more light-emitting diodes (LEDs). In another embodiment, the light-emitting module 16 may also be a LED array or other similar components.

The pre-startup module 17 is connected to the rectifying module 13 and the power factor correction module 14.

The auxiliary power source module 18 is connected to the power factor correction module 14 and the voltage converting module 15.

The input module 11 receives an input voltage from the external power source. The filtering module 12 receives the input voltage and filters the input voltage to generate a filtered voltage. The rectifying module 13 receives the filtered voltage and rectifies the filtered voltage to generate a rectified voltage.

Then, the pre-startup module 17 may execute a pre-startup mode. The pre-startup module 17 receives the rectified voltage to enter the on state. Subsequently, the pre-startup module 17 converts the rectified voltage into a pre-startup voltage to drive the power factor correction module 14, such that the power factor correction module 14 enters the on state.

After entering the on state, the power factor correction module 14 can receive the rectified voltage and convert the rectified voltage into a corrected voltage. Then, the voltage converting module 15 receives the corrected voltage and converts the corrected voltage into a driving voltage so as to drive the light-emitting module 16 via the output module 19.

Finally, the voltage extracting unit 151 of the voltage converting module 15 converts the driving voltage into an output voltage according to a default converting ratio, and the auxiliary power source module 18 can operate in a normal power supplying mode to convert the output voltage into an operating voltage. The operating voltage so as to drive the power factor correction module 14 via the operating voltage. After being driven by the operating voltage, the pre-startup module 17 enters the off state.

The above-described multi-stage chip power supplying mechanism includes the pre-startup mode and the normal power supplying mode. The pre-startup mode starts the power factor correction module 14 when the lighting device 1 is connected to the external power source. Subsequently, the auxiliary power source module 18 operates in the normal power supplying mode to drive the power factor correction module 14.

The above multi-stage chip power supplying mechanism can meet the requirements of a wide input voltage so as to satisfy actual requirements. Additionally, the losses of the lighting device 1 do not increase with changes in input voltage or operating frequency. Thus, the driving efficiency of the lighting device 1 can be enhanced, which can effectively enhance the performance and reliability of the lighting device 1.

The embodiment just exemplifies the present invention and is not intended to limit the scope of the present invention; any equivalent modification and variation according to the spirit of the present invention is to be also included within the scope of the following claims and their equivalents.

Figure 2:
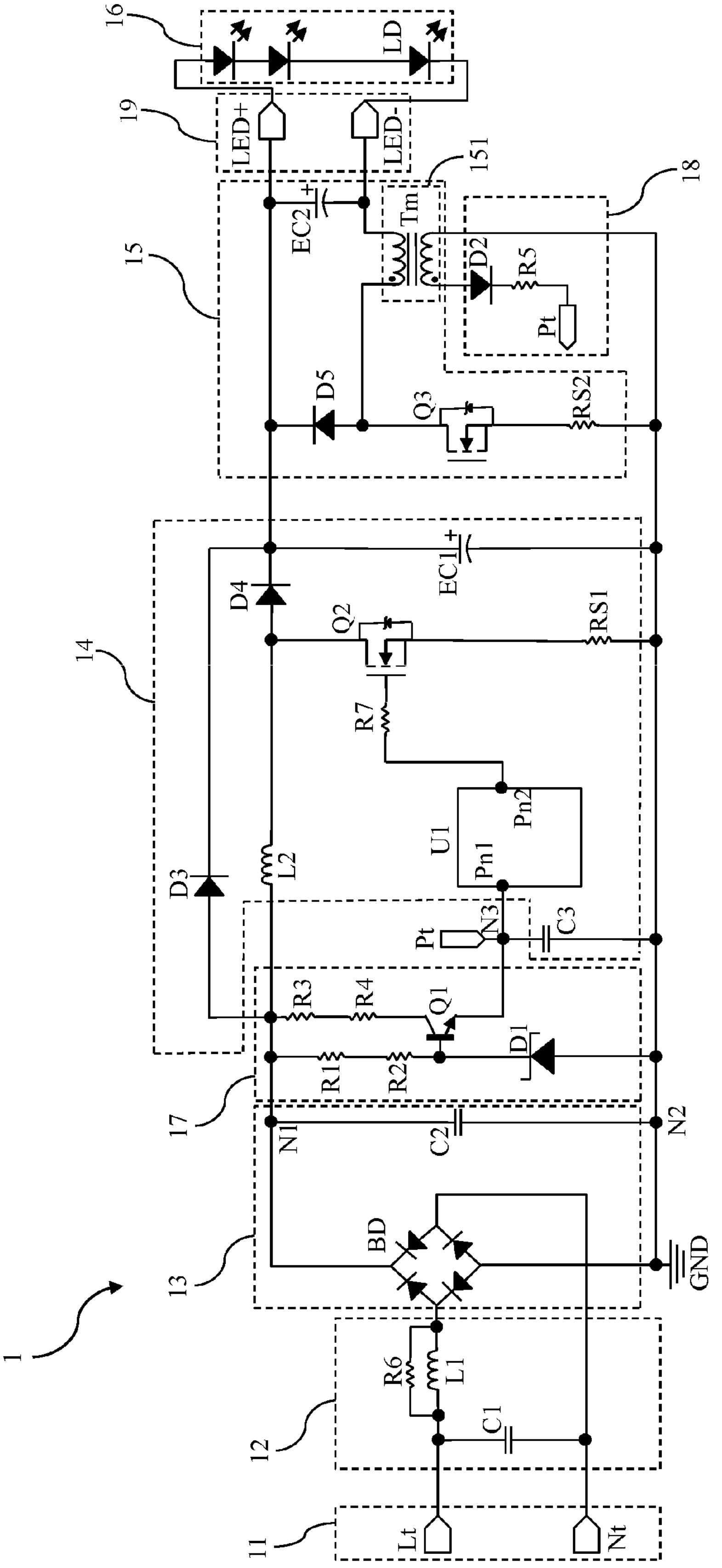
FIG. 2 is the circuit diagram of the lighting device with multi-stage chip power supplying mechanism capable of improving driving efficiency in accordance with the first embodiment of the present invention.

Please refer to FIG. 2, which is the circuit diagram of the lighting device with multi-stage chip power supplying mechanism capable of improving driving efficiency in accordance with the first embodiment of the present invention. As shown in FIG. 2, the lighting device 1 includes an input module 11, a filtering module 12, a rectifying module 13, a power factor correction module 14, a voltage converting module 15, a light-emitting module 16, a pre-startup module 17, an auxiliary power source module 18, and an output module 19.

The input module 11 is connected to an external power source (not shown in the drawings) and includes a live wire input terminal Lt and a neutral wire input terminal Nt.

The filtering module 12 is connected to the input module 11. The filtering module 12 includes a first inductor L1, a first capacitor C1, and a sixth resistor R6.

The rectifying module 13 is connected to the filtering module 12. The rectifying module 13 may include a rectifier BD and a second capacitor C2.

The power factor correction module 14 is connected to the rectifying module 13. The power factor correction module 14 may be an APFC circuit. The power factor correction module 14 includes a control chip U1, a second inductor L2, a third diode D3, a fourth diode D4, a seventh resistor R7, a first current-limiting resistor RS1, a second switch Q2, a first electrolytic capacitor EC1, and a third capacitor C2. The control chip U1 has a power supplying pin Pn1 and a control pin Pn2.

The voltage converting module 15 is connected to the power factor correction module 14. The voltage converting module 15 includes a fifth diode D5, a third switch Q3, a second current-limiting resistor RS2, a second electrolytic capacitor EC2, and a voltage extracting unit 151. The voltage extracting unit 151 may include a transformer Tm.

The output module 19 is connected to the voltage converting module 15, and the light-emitting module 16 is connected to the output module 19. The output module 19 includes a positive output terminal LED+ and a negative output terminal LED−. The light-emitting module 16 may include several LEDs LD.

The pre-startup module 17 is connected to the rectifying module 13 and the power factor correction module 14. The pre-startup module 17 includes a first resistor R1, a second resistor R2, a third resistor R3, a fourth resistor R4, a first switch Q1, and a first diode D1. In this embodiment, the first switch Q1 is a bipolar junction transistor (BJT). In another embodiment, the first switch Q1 may also be a metal-oxide-semiconductor field-effect transistor (MOSFET). In this embodiment, the first diode D1 may be a Zener diode. In another embodiment, the first diode D1 may also be a common diode. One end of the first resistor R1 is connected to the first node N1, and the other end of the first resistor R1 is connected to one end of the second resistor R2. The other end of the second resistor R2 is connected to the first end (base) of the first switch Q1 and the negative end of the first diode D1. The positive end of the first diode D1 is connected to the second node N2. One end of the third resistor R3 is connected to the first node N1, and the other end of the third resistor R3 is connected to one end of the fourth resistor R4. The other end of the fourth resistor R4 is connected to the second end (collector) of the first switch Q1, and the third end (emitter) of the first switch Q1 is connected to the third node N3. The first node N1 and the second node N2 are respectively connected to the two output terminals of the rectifying circuit 13. The second node N2 is also connected to the grounding point GND. The third node N3 is connected to the power supplying pin Pn1 of the power factor correction module 14.

The auxiliary power source module 18 is connected to the power factor correction module 14 and the voltage converting module 15. The auxiliary power source module 18 includes a second diode D2, a fifth resistor R5, and an operating voltage output terminal Pt. The positive electrode of the second diode D2 is connected to the voltage extracting unit 151, and the negative electrode of the second diode D2 is connected to one end of the fifth resistor R5. The other end of the fifth resistor R5 is connected to the operating voltage output terminal Pt, and the operating voltage output terminal Pt is connected to the third node N3.

The input module 11 receives an input voltage from an external power source. The filtering module 12 receives the input voltage and filters the input voltage to generate a filtered voltage. The rectifying module 13 receives the filtered voltage and rectifies the filtered voltage to generate a rectified voltage.

Then, the pre-startup module 17 can execute the pre-startup mode, which can receive the rectifying voltage. Then, the rectifying voltage forms a path between the first resistor R1, the second resistor R2, and the first diode D1. Since the base current required for the first switch Q1 (transistor) to conduct is very low, the resistances of the current-limiting resistors (the first resistor R1 and the second resistor R2) can be very high (greater than 2MΩ), which can effectively reduce losses. After the first diode D1 is turned on, the current passes through the third resistor R3, the fourth resistor R4, and the first switch Q1, and then through the collector and emitter of the first switch Q1 to power the control chip U1, so the control chip U1 can enter the on state. The resistances of the third resistor R3 and the fourth resistor R4 can be appropriately adjusted according to the specifications of the control chip U1, so that the control chip U1 can start even at low voltage, which can meet the requirements of a wide input voltage.

Next, after the control chip U1 enters the on state, the power factor correction module 14 can receive the rectified voltage and convert the rectified into a corrected voltage. Then, the voltage converting module 15 receives the corrected voltage and converts the corrected voltage into a driving voltage to drive the light-emitting module 16 via the output module 19.

Finally, when the lighting device 1 enters a normal operating state, the current flows through the positive output terminal LED+ and the negative output terminal LED−, then through the transformer Tm, and then through the third switch Q3. When the third switch Q3 enters the off state, the current flows through the fifth diode D5 to form a continuous flow path. At this point, the voltage of the primary winding of the transformer Tm will be consistent with the load voltage of the light-emitting module 16. Therefore, by setting the default converting ratio of the transformer Tm, the voltage of the secondary winding of the transformer Tm will be greater than the minimal operating voltage of the control chip U1, and the voltage regulating value of the first diode D1 is also set to be less than the minimal operating voltage of the control chip U1. As a result, the voltage of the secondary winding of the transformer Tm will continuously convert the driving voltage into the output voltage. The auxiliary power source module 18 can then execute the normal power supplying mode to convert the output voltage into the operating voltage and output the operating voltage through the operating voltage output terminal Pt to drive the control chip U1. Since the voltage of the primary winding of the transformer Tm is consistent with the load voltage of the light-emitting module 16, the voltage of the secondary winding of the transformer Tm is also a constant value and will not change due to variations in input voltage or operating frequency. When the power factor correction module 14 is driven by the operating voltage, because the base voltage of the first switch Q1 is less than the operating voltage outputted by the operating voltage output terminal Pt, the first switch Q1 enters the off state in order to disconnect the connection between the third resistor R3 and the fourth resistor R4 and the power supply pin Pn1. Afterward, the pre-startup mode ends.

As set forth above, the lighting device 1 has the special multi-stage chip power supplying mechanism, including the pre-startup mode and the normal power supplying mode. The pre-startup mode can start the power factor correction module 14 when the lighting device 1 is connected to the external power source, and the operating mechanism of the normal power supplying mode is independent of the input voltage. Therefore, the operating voltage of the control chip U1 of the power factor correction module 14 can remain constant under changing input voltage conditions so as to achieve low losses. As a result, the power consumption of the lighting device 1 will not increase with changes in input voltage, so the driving efficiency of the lighting device 1 can be significantly increased. Thus, the efficiency and reliability of the lighting device 1 can be effectively enhanced.

In addition, the lighting device 1 has the special multi-stage chip power supplying mechanism, including the pre-startup mode and the normal power supplying mode. The pre-startup mode can start the power factor correction module 14 when the lighting device 1 is connected to the external power source, and the operation mechanism of the normal power supplying mode is independent of changes in operating frequency. Therefore, the operating voltage of the control chip U1 of the power factor correction module 14 can remain constant under changing operating frequency conditions in order to achieve low losses. Accordingly, driving efficiency of the lighting device 1 can be further improved so as to enhance the efficiency and reliability of the lighting device 1.

Furthermore, the normal power supplying mode of the multi-stage chip power supplying mechanism of the lighting device 1 can stably drive the control chip U1 of the power factor correction module 1, so the control chip U1 can stably operate for a long time. As a result, the operating temperature of the control chip U1 can be significantly reduced, which can reduce the energy consumption of the lighting device 1 so as to meet the demand for energy-saving. Therefore, the lighting device 1 can be more in line with future development trends.

The embodiment just exemplifies the present invention and is not intended to limit the scope of the present invention; any equivalent modification and variation according to the spirit of the present invention is to be also included within the scope of the following claims and their equivalents.

It is worthy to point out that currently available driver power supplies, when applied to products with a wide input voltage range, experience increased losses due to significant voltage differences for powering driving chips. Additionally, during frequency variations, there is considerable voltage fluctuation in supplying power to driving chips, further exacerbating losses. These factors not only directly lead to overheating of driving chips but also affect the reliability of these chips. By contract, according to one embodiment of the present invention, the lighting device comprises a light-emitting module, a rectifying module, a pre-startup module, a power factor correction module, a voltage converting module, and an auxiliary power source module. The rectifying module generates a rectified voltage. The pre-startup module receives the rectified voltage to enter the on state and then converts the rectified voltage into pre-startup voltage. The power factor correction module receives the pre-startup voltage to enter the on state and further converts the rectified voltage into a corrected voltage. The voltage converting module includes a voltage extracting unit. The voltage converting module converts the corrected voltage into driving voltage to drive the light-emitting module, and the voltage extracting unit converts the driving voltage into an output voltage according to a default converting ratio. The auxiliary power source module converts the output voltage into operating voltage to drive the power factor correction module. After the power factor correction module is driven by the operating voltage, the pre-startup module enters the off state. The multi-stage chip power supplying mechanism described above includes a pre-startup mode and a normal power supplying mode, where the pre-startup mode can start the power factor correction module when the lighting device is connected to an external power source, which can meet the requirements of a wide input voltage. Therefore, the lighting device can conform to actual requirements.

Also, according to one embodiment of the present invention, the lighting device has a special multi-stage chip power supplying mechanism including the pre-startup mode and normal power supplying mode. The pre-startup mode can start the power factor correction module when the lighting device is connected to the external power source, and the operation mechanism of the normal power supplying mode is independent of the input voltage, so the control chip of the power factor correction module can have a constant operating voltage under variable input voltage conditions, which can achieve low losses. Consequently, the losses of the lighting device do not increase with changes in input voltage, which can significantly improve the driving efficiency of the lighting device and effectively enhancing the performance and reliability of the lighting device.

Further, according to one embodiment of the present invention, the lighting device has the special multi-stage chip power supplying mechanism including the pre-startup mode and normal power supplying mode. The pre-startup mode can start the power factor correction module when the lighting device is connected to the external power source, and the operation mechanism of the normal power supplying mode is independent of changes in operating frequency. Accordingly, the control chip of the power factor correction module can have a constant operating voltage under variable operating frequency conditions, which can achieve low losses and further enhancing the driving efficiency. Therefore, the performance and reliability of the lighting device can be further enhanced.

Moreover, according to one embodiment of the present invention, the normal power supplying mode of the multi-stage chip power supplying mechanism of the lighting device can stably drive the control chip of the power factor correction module. Thus, the control chip can stably operate for a long time. As a result, the operating temperature of the control chip can be significantly reduced, which can decrease the energy consumption of the lighting device in order to satisfy the requirements of energy conservation. Therefore, the lighting device can meet future development trends.

Furthermore, according to one embodiment of the present invention, the multi-stage chip power supplying mechanism of the lighting device can be implemented with a simple circuit, so the lighting device can achieve the desired technical effects without significantly increasing the cost thereof. As a result, the practicality of the lighting device can be further enhanced. Consequently, the application of the lighting device can be more comprehensive so as to conform to the requirements of different applications. As described above, the lighting device according to the embodiments of the present invention can definitely achieve great technical effects.

Figure 3:
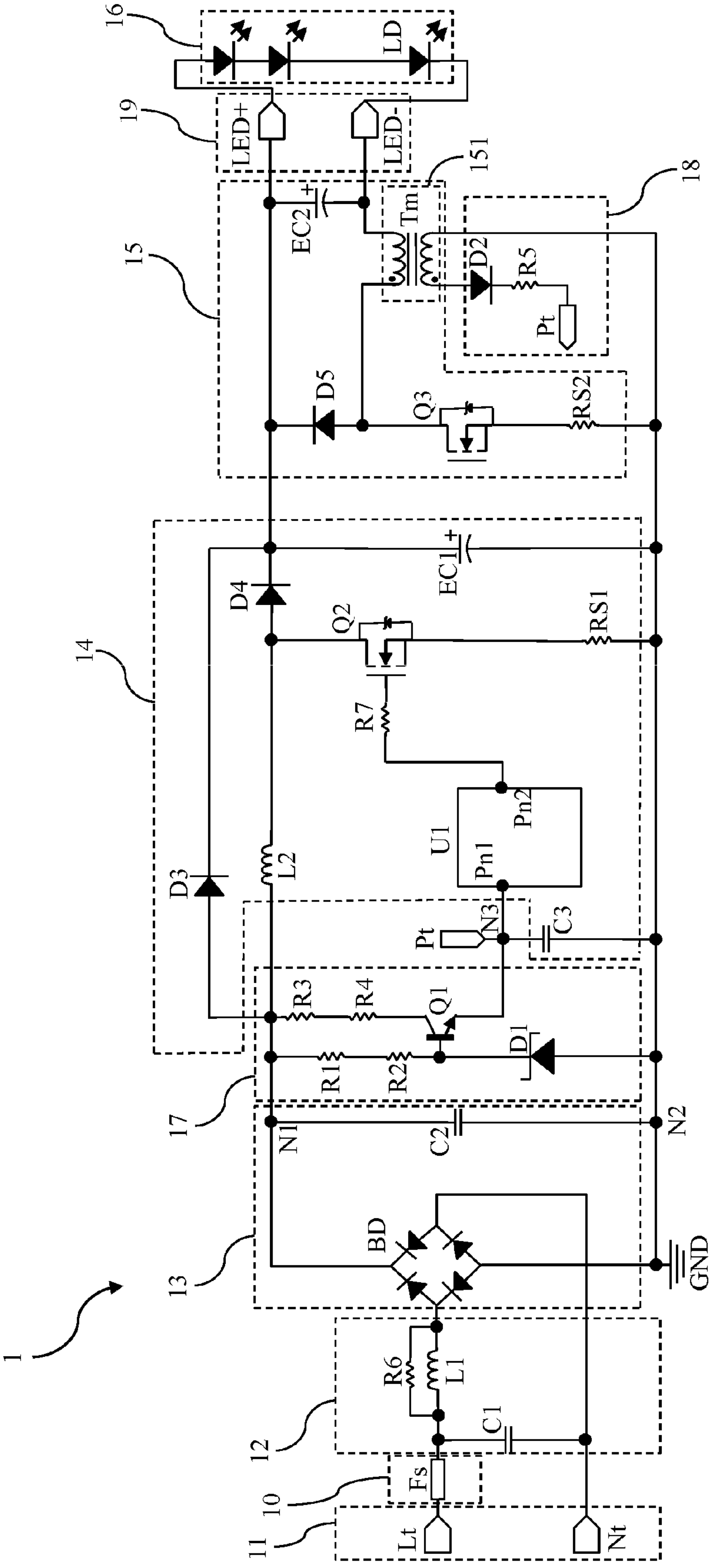
FIG. 3 is the circuit diagram of the lighting device with multi-stage chip power supplying mechanism capable of improving driving efficiency in accordance with the second embodiment of the present invention.

Please refer to FIG. 3, which is the circuit diagram of the lighting device with multi-stage chip power supplying mechanism capable of improving driving efficiency in accordance with the second embodiment of the present invention. As shown in FIG. 3, the lighting device 1 includes an input module 11, a filtering module 12, a rectifying module 13, a power factor correction module 14, a voltage converting module 15, a light-emitting module 16, a pre-startup module 17, an auxiliary power source module 18, and an output module 19.

The input module 11 is connected to an external power source (not shown in the drawings) and includes a live wire input terminal Lt and a neutral wire input terminal Nt.

The filtering module 12 is connected to the input module 11. The filtering module 12 includes a first inductor L1, a first capacitor C1, and a sixth resistor R6.

The rectifying module 13 is connected to the filtering module 12. The rectifying module 13 may include a rectifier BD and a second capacitor C2.

The power factor correction module 14 is connected to the rectifying module 13. The power factor correction module 14 may be an APFC circuit. The power factor correction module 14 includes a control chip U1, a second inductor L2, a third diode D3, a fourth diode D4, a seventh resistor R7, a first current-limiting resistor RS1, a second switch Q2, a first electrolytic capacitor EC1, and a third capacitor C2. The control chip U1 has a power supplying pin Pn1 and a control pin Pn2.

The voltage converting module 15 is connected to the power factor correction module 14. The voltage converting module 15 includes a fifth diode D5, a third switch Q3, a second current-limiting resistor RS2, a second electrolytic capacitor EC2, and a voltage extracting unit 151. The voltage extracting unit 151 may include a transformer Tm.

The output module 19 is connected to the voltage converting module 15, and the light-emitting module 16 is connected to the output module 19. The output module 19 includes a positive output terminal LED+ and a negative output terminal LED−. The light-emitting module 16 may include several LEDs LD.

The pre-startup module 17 is connected to the rectifying module 13 and the power factor correction module 14. The pre-startup module 17 includes a first resistor R1, a second resistor R2, a third resistor R3, a fourth resistor R4, a first switch Q1, and a first diode D1. In this embodiment, the first switch Q1 is a bipolar junction transistor (BJT). In another embodiment, the first switch Q1 may also be a metal-oxide-semiconductor field-effect transistor (MOSFET). In this embodiment, the first diode D1 may be a Zener diode. In another embodiment, the first diode D1 may also be a common diode. One end of the first resistor R1 is connected to the first node N1, and the other end of the first resistor R1 is connected to one end of the second resistor R2. The other end of the second resistor R2 is connected to the first end (base) of the first switch Q1 and the negative end of the first diode D1. The positive end of the first diode D1 is connected to the second node N2. One end of the third resistor R3 is connected to the first node N1, and the other end of the third resistor R3 is connected to one end of the fourth resistor R4. The other end of the fourth resistor R4 is connected to the second end (collector) of the first switch Q1, and the third end (emitter) of the first switch Q1 is connected to the third node N3. The first node N1 and the second node N2 are respectively connected to the two output terminals of the rectifying circuit 13. The second node N2 is also connected to the grounding point GND. The third node N3 is connected to the power supplying pin Pn1 of the power factor correction module 14.

The auxiliary power source module 18 is connected to the power factor correction module 14 and the voltage converting module 15. The auxiliary power source module 18 includes a second diode D2, a fifth resistor R5, and an operating voltage output terminal Pt. The positive electrode of the second diode D2 is connected to the voltage extracting unit 151, and the negative electrode of the second diode D2 is connected to one end of the fifth resistor R5. The other end of the fifth resistor R5 is connected to the operating voltage output terminal Pt, and the operating voltage output terminal Pt is connected to the third node N3.

The above elements are similar to those of the previous embodiment, so will not be described herein again. The difference between this embodiment and the previous embodiment is that the lighting device 1 of this embodiment further includes a protection module 10. The protection module 10 is disposed between the filtering module 12 and the input module 11. In this embodiment, the protection module 10 includes a fuse Fs. In another embodiment, the protection module 10 may be any other circuits having over-current protection function. The above circuit design can further enhance the safety of the lighting device 1, so the lighting device 1 can meet the actual requirements.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device comprises a light-emitting module, a rectifying module, a pre-startup module, a power factor correction module, a voltage converting module, and an auxiliary power source module. The rectifying module generates a rectified voltage. The pre-startup module receives the rectified voltage to enter the on state and then converts the rectified voltage into pre-startup voltage. The power factor correction module receives the pre-startup voltage to enter the on state and further converts the rectified voltage into a corrected voltage. The voltage converting module includes a voltage extracting unit. The voltage converting module converts the corrected voltage into driving voltage to drive the light-emitting module, and the voltage extracting unit converts the driving voltage into an output voltage according to a default converting ratio. The auxiliary power source module converts the output voltage into operating voltage to drive the power factor correction module. After the power factor correction module is driven by the operating voltage, the pre-startup module enters the off state. The multi-stage chip power supplying mechanism described above includes a pre-startup mode and a normal power supplying mode, where the pre-startup mode can start the power factor correction module when the lighting device is connected to an external power source, which can meet the requirements of a wide input voltage. Therefore, the lighting device can conform to actual requirements.

Also, according to one embodiment of the present invention, the lighting device has a special multi-stage chip power supplying mechanism including the pre-startup mode and normal power supplying mode. The pre-startup mode can start the power factor correction module when the lighting device is connected to the external power source, and the operation mechanism of the normal power supplying mode is independent of the input voltage, so the control chip of the power factor correction module can have a constant operating voltage under variable input voltage conditions, which can achieve low losses. Consequently, the losses of the lighting device do not increase with changes in input voltage, which can significantly improve the driving efficiency of the lighting device and effectively enhancing the performance and reliability of the lighting device.

Further, according to one embodiment of the present invention, the lighting device has the special multi-stage chip power supplying mechanism including the pre-startup mode and normal power supplying mode. The pre-startup mode can start the power factor correction module when the lighting device is connected to the external power source, and the operation mechanism of the normal power supplying mode is independent of changes in operating frequency. Accordingly, the control chip of the power factor correction module can have a constant operating voltage under variable operating frequency conditions, which can achieve low losses and further enhancing the driving efficiency. Therefore, the performance and reliability of the lighting device can be further enhanced.

Moreover, according to one embodiment of the present invention, the normal power supplying mode of the multi-stage chip power supplying mechanism of the lighting device can stably drive the control chip of the power factor correction module. Thus, the control chip can stably operate for a long time. As a result, the operating temperature of the control chip can be significantly reduced, which can decrease the energy consumption of the lighting device in order to satisfy the requirements of energy conservation. Therefore, the lighting device can meet future development trends.

Furthermore, according to one embodiment of the present invention, the multi-stage chip power supplying mechanism of the lighting device can be implemented with a simple circuit, so the lighting device can achieve the desired technical effects without significantly increasing the cost thereof. As a result, the practicality of the lighting device can be further enhanced. Consequently, the application of the lighting device can be more comprehensive so as to conform to the requirements of different applications.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having multi-stage chip power supplying mechanism capable of improving driving efficiency, comprising:

a light-emitting module;

a rectifying module configured to generate a rectified voltage;

a pre-startup module configured to receive the rectified voltage to enter on state and convert the rectified voltage into a pre-startup voltage;

a power factor correction module configured to receive the pre-startup voltage to enter on state and convert the rectified voltage into a corrected voltage;

a voltage converting module configured to convert the corrected voltage into a driving voltage in order to drive the light-emitting module, wherein the voltage converting module comprises a volage extracting unit configured to convert the driving voltage into an output voltage according to a default converting ratio; and an auxiliary power source module configured to convert the output voltage into an operating voltage so as to drive the power factor correction module;

wherein the pre-startup module is configured to enter an off state in order to disconnect from the power factor correction module after the power factor correction module is driven by the operating voltage.

2. The lighting device having multi-stage chip power supplying mechanism capable of improving driving efficiency as claimed in claim 1, wherein the voltage extracting unit is a transformer.

3. The lighting device having multi-stage chip power supplying mechanism capable of improving driving efficiency as claimed in claim 1, wherein the pre-startup module includes a first resistor, a second resistor, a third resistor, a first switch and a first diode, wherein one end of the first resistor is connected to a first node and another end of the firsts resistor is connected one end of the second resistor, wherein the another end of the second resistor is connected to a first end of the first switch and a negative electrode of the first diode, and a positive electrode of the first diode is connected to a second node, wherein one end of the third resistor is connected to the first node and another end of the third resistor is connected to one end of the fourth resistor, wherein another end of the fourth resistor is connected to a second end of the first switch and a third end of the first switch is connected to a third node, wherein the first node and the second node are connected to two output ends of the rectifying module respectively, and the third node is connected to a power supplying pin of the power factor correction module.

4. The lighting device having multi-stage chip power supplying mechanism capable of improving driving efficiency as claimed in claim 3, wherein the second node is further connected to a grounding point.

5. The lighting device having multi-stage chip power supplying mechanism capable of improving driving efficiency as claimed in claim 3, wherein the auxiliary power source module comprises a second diode, a fifth resistor ad an operating voltage outputting end, wherein a positive electrode of the second diode is connected to the voltage extracting unit and a negative electrode of the second diode is connected to one end of the fifth resistor, wherein another end of the fifth resistor is connected to the operating voltage outputting end and the operating voltage outputting end is connected to the third node.

6. The lighting device having multi-stage chip power supplying mechanism capable of improving driving efficiency as claimed in claim 1, further comprising a filtering module connected to an external power source and the rectifying module.

7. The lighting device having multi-stage chip power supplying mechanism capable of improving driving efficiency as claimed in claim 1, further comprising an input module, wherein the filtering module is connected to the external power source via the input module.

8. The lighting device having multi-stage chip power supplying mechanism capable of improving driving efficiency as claimed in claim 7, further comprising a protection module disposed between the filtering module and the input module.

9. The lighting device having multi-stage chip power supplying mechanism capable of improving driving efficiency as claimed in claim 1, wherein the power factor correction module is an active power factor correction circuit.

10. The lighting device having multi-stage chip power supplying mechanism capable of improving driving efficiency as claimed in claim 1, wherein the voltage converting module is a buck converter, a boost converter, a buck-boost converter or a flyback converter.

* * * * *